UNITED STATES PATENT OFFICE.

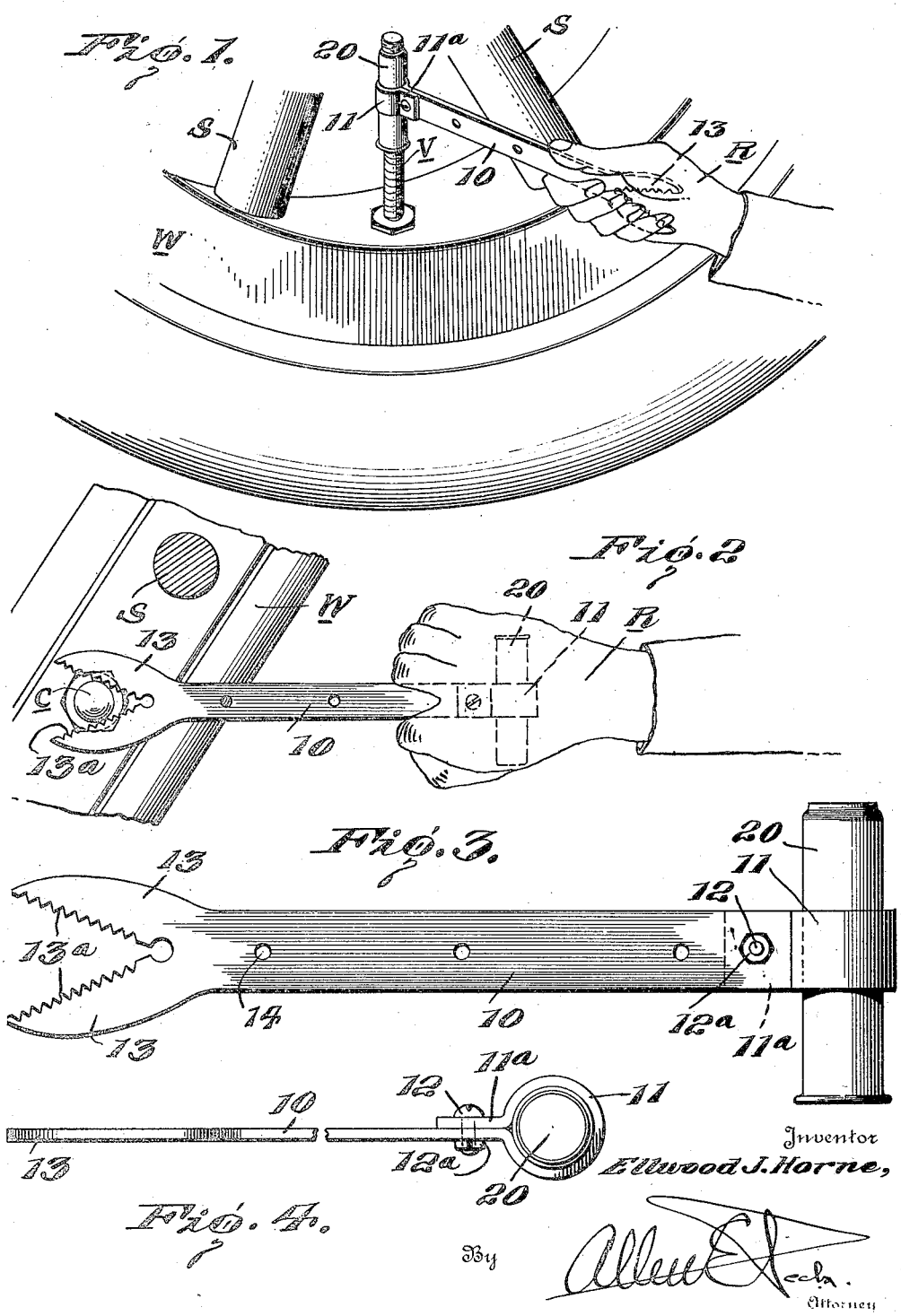

ELLWOOD J. HORNE, OF WOMELSDORF, PENNSYLVANIA.

MEANS FOR SUPPORTING AND OPERATING TIRE-PRESSURE GAUGES AND THE LIKE.

1,427,389. Specification of Letters Patent. Patented Aug. 29, 1922.

Application filed August 20, 1921. Serial No. 494,011.

*To all whom it may concern:*

Be it known that I, ELLWOOD J. HORNE, a citizen of the United States of America, and resident of Womelsdorf, county of Berks, State of Pennsylvania, have invented certain new and useful Improvements in Means for Supporting and Operating Tire-Pressure Gauges and the like, of which the following is a specification.

This invention relates to certain improvements in means for supporting and operating tire pressure gauges and the like; and the nature and objects of the invention will be readily understood by those skilled in the art in the light of the following explanation and detailed description of the accompanying drawings illustrating what I at present believe to be the preferred embodiments or mechanical expressions of my invention from among other forms, embodiments, arrangements, combinations and constructions within the spirit and scope thereof.

In the operation and use of pneumatic vehicle tires, to secure the maximum efficiency and performance of which such tires are capable, it is essential that the amount of air pressure therein be determined in order to prevent and avoid over inflation or under inflation and permit maintenance of the proper air pressure therein, as determined for each particular type and construction of tire and the circumstances and conditions surrounding its use. Various means have been developed for determining the air pressure in a pneumatic vehicle tire, and those skilled in this art are familiar with certain types of such means now in universal use in the form of comparatively small gauges which may be readily carried in the pocket, in a tool box or numerous other convenient locations for immediate use, and which gauges in operation are applied to the valve stem of a vehicle tire, with the cap of the stem removed, and by opening the valve causes the air within the tire to actuate certain mechanism which visibly indicates the air pressure in the tire.

The present invention has particular reference and applicability to those standard types of tire pressure gauges in universal use and well known to those familiar with this art, as the "Schrader" gauge and the "Twitchell" gauge, respectively. It is not deemed necessary herein to present a detailed description of the construction and operation of the aforenamed well known types of pressure gauges, but in order to more clearly set forth the present invention and the advance or step forward in the art made thereby, certain of the prevailing and serious disadvantages of these types of gauges, which are overcome by this invention are referred to herein after.

Due to the construction and arrangement of vehicle wheels formed to receive pneumatic tires, the tire valve stem extends through the felly of the wheel and inwardly a distance between spokes of the wheel toward the hub thereof, or in the case of the so called disk or solid types of wheel the tire valve stem extends inwardly along a face of the wheel in some instances, and in others an opening is provided in the disk across which the stem extends. The standard valve and valve stem is provided with a protective cap covering the inner end thereof and which cap must be removed in applying and operating one of these tire gauges to determine the air pressure in the tire. Now, after extensive use of these tire gauges over a considerable period of time it has been found exceedingly difficult and a great disadvantage to extend the hand between the spokes of a wheel, remove the cap and by assuming a cramped, unnatural position of the hand grasp a tire gauge and apply the same to the valve and stem positioned in the confined space between spokes to secure a reading from the gauge indicating the air pressure in the tire. Further, it is found that due to the confined space between the spokes it is extremely difficult to properly apply the gauge to insure an accurate pressure measurement. The foregoing disadvantages are also found to exist in wheels of the disk or solid type.

Further, in applying and operating these types of gauges it is necessary to remove the valve cap by hand or locate and employ a separate tool for removing the same which causes considerable inconvenience and loss of time. Then, by the very nature of such gauges, which permits of their being stored or carried in a small space, they are repeatedly being mislaid and lost, so again time is lost and great inconvenience caused users in locating a gauge when required.

It is one of the main objects, among others, of this invention to provide means for supporting and operating pneumatic tire pressure gauges of the herein before referred to general types, which will overcome the various serious disadvantages to the efficient and accurate use inherent in these gauges, by permitting ready application of the gauge to the valve stem of a tire, in proper position for securing an accurate pressure measurement, without requiring insertion of the hand in a cramped, unnatural position between the spokes of a wheel or against or through a disk or solid wheel.

It is a further object of this invention to provide means for supporting and applying tire pressure gauges, which means forms and includes an implement for removing the valve stem cap and nut, thus avoiding the use of the hand or a separate tool, and in which means the tire pressure gauge forms and functions as a handle to give a natural, firm grip for the hand in using the invention to remove a valve cap or nut.

A still further object of the invention is to provide means for supporting and applying tire pressure gauges, which is adjustable to receive various sizes and types of gauges and to which the gauges may be readily attached or detached.

And a still further object of the invention is to provide means for supporting and applying tire pressure gauges which will prevent misplacement and loss of a gauge and by which it may be readily secured at a convenient point for use when required.

With the foregoing and various other objects in view, which will be readily recognized and appreciated by those familiar with this art, the invention consists in certain novel features in construction and in arangements and combinations, as more fully specified and referred to hereinafter.

Referring to the accompanying drawings:—

Figure 1 is a perspective view of the means of the present invention showing a tire-pressure gauge manually applied and supported thereby in operative position on the valve stem of a tire, a portion of a vehicle wheel and tire and the position of the operator's hand with respect to the wheel, being shown.

Fig. 2 is a view showing the means of the invention operated as a wrench and applied to remove the valve stem cap of a tire, the position of the hand of the operator grasping the tire pressure gauge as a handle being shown.

Fig. 3 is a view in side elevation.

Fig. 4 is a view in edge elevation.

In the particular embodiment of my invention illustrated in the accompanying drawings by way of example, I show the substantially flat strip of material, preferably, although not necessarily of metal, forming the body length or shank 10. One end portion of the body length or shank 10 is bent, or otherwise formed, to provide the pressure gauge receiving and retaining loop 11 having the flat clamping plate 11ª formed by the free end length of the loop 11, parallel with and adapted to bear against the adjacent face of the shank 10. A loop adjusting and clamping bolt 12 extends through the shank 10 and clamping plate 11ª of the loop, and this bolt 12 is provided with the nut 12ª for drawing the clamping plate 11ª against the shank 10 and securing the loop 11 firmly around any element mounted therein. The opposite end of the shank 10 is enlarged and the central portion thereof is cut away to form the opposite, diverging jaws 13 having the inner, opposed edges thereof serrated or toothed at 13ª, to provide a wrench of the rigid, alligator jaw type.

As hereinbefore referred to, the present invention is particularly applicable to tire pressure gauges of the well known and universally used "Schrader" and "Twitchell" types, although it is to be understood that it is not intended or desired to limit the invention to these specifically named types, as the invention is applicable to any and all tire pressure gauges typified generally by these aforementioned types. In the example illustrated herewith I show the invention applied to a tire pressure gauge 20, of the "Schrader" type. The gauge 20 is mounted in the loop 11 of the shank 10, with the loop, the material of which is of considerably less width than the length of the gauge, positioned around the gauge 20 intermediate the ends thereof. The nut 12ª is tightened on the bolt 12 and the clamping plate 11ª is drawn toward the shank 10 with the loop 11 firmly and securely maintained around and retaining the gauge 20 in proper position in the loop 11, with respect to the shank 10. It is apparent that, due to the construction of the loop 11 with the clamping plate 11ª and the bolt 12 and nut 12ª, any size and shape of pressure gauge, within the range of the extreme adjusted positions of the loop 11, can be securely and firmly mounted in operative position on the shank 10.

In order to operate a tire pressure gauge to determine the air pressure in a tire it is necessary to remove the valve stem cap of the tire, apply the tire pressure gauge to secure the air pressure reading and then remove the gauge and replace the valve stem cap. Heretofore, the fingers of the hand have been utilized, or a separate tool has been required to remove and replace the valve stem cap, with the attending disadvantages and inconvenience of such operations. With the hereinbefore described means of the invention, the tire pressure gauge 20 is firmly mounted and secured in the retaining loop 11 and extends across the end of the shank 10, opposite the end thereof providing the jaws 13, so that, to remove the valve stem cap C the shank 10 is supported by the hand R (see Fig. 2) grasping the tire gauge 20 as a cross handle, the opposite end of the shank 10 is extended between the spokes S of the wheel W with the jaws 13 engaging the cap C of the valve stem V, and the shank is then operated as a wrench by the hand R to unscrew and remove the cap C. The cap C is replaced in a similar manner after the operation of the tire gauge. Thus, it is seen that the means of the invention supplies a wrench secured to and rigid with the tire pressure gauge which forms a handle therefor, and that the disadvantges and inconveniences of the use of the fingers, or a separate tool, are overcome and avoided with resulting increase in the time and trouble of removing and applying the valve stem cap for operation of the tire pressure gauge.

After removal of the valve stem cap by operation of the means of the invention as a wrench, the tool is reversed in the hand and grasped at the jaw end thereof. The application of a tire pressure gauge to the valve stem of a tire is clearly shown in Figure 1, of the accompanying drawings, in which the hand R grasps the jaw end of the shank 10 and the tire gauge 20 mounted in the retaining loop 11, is extended between the spokes S of the wheel and applied to the valve stem in proper position and alinement for securing an accurate air pressure measurement. It will be particularly noted that the gauge 20 is supported in applied position by the hand R grasping the jaw end of the shank 20 at a remote distance from the gauge located between the spokes, but that by slight and natural movements of the hand R the gauge 20 may be moved in all desired directions to secure the proper application to the valve stem V located in the confined space between the wheel spokes S. In the foregoing manner the necessity of extending the hand between the spokes to attempt to apply the tire pressure gauge is avoided and the great practical disadvantage of improper alinement with the resulting inaccurate pressure measurements, due to the forced cramped position assumed in extending the hand in the confined space between spokes, is completely overcome.

The shank 10 is preferably formed of a flat material which permits of its being readily packed or placed in a tool box, vehicle side pockets, or other convenient or desired location. Suitable bores or holes 14 are provided at intervals in the body length or shank 10 for chaining or otherwise attaching the tire pressure gauge and supporting and applying means to a convenient point insuring accessibility and against loss, such place for example as a tire inflator or the air hose thereof.

Attention is directed to the fact that the invention may be formed integral with the tire pressure gauge as a part thereof, this form not being shown as the preferred manner of constructing the means of the invention is with the adjustable gauge mounting and retaining loop, and further the invention may be constructed with a rigid, nonadjustable loop, for example, by welding the free end formed by bending the loop from the shank, to the body length or shank.

It is evident that the invention is capable of various modifications, changes, substitutions, and variations, and hence I do not desire to limit my invention to the exact disclosures hereof.

Desiring to protect my invention in the broadest manner legally possible, what I claim is:—

1. Means for manually supporting and operating a tire pressure gauge comprising a body length formed with an adjustable loop at one end thereof for detachably mounting a tire pressure gauge and formed at the opposite end thereof to provide jaws, the said body length providing means for manually applying a tire pressure gauge mounted in said loop end thereof, and the jaws providing means to aline the gauge with a valve stem.

2. A device for manually applying and operating a tire pressure gauge, comprising a body length formed with a tire pressure gauge receiving member at one end thereof, and formed at the opposite end thereof to provide jaws, the said body length providing means for applying a tire pressure gauge mounted in said gauge receiving member to a valve stem, and the said jaws providing means to aline the gauge with the valve stem.

3. In a device for applying and operating a tire pressure gauge, a member adapted to extend laterally from and rigid with a tire pressure gauge, the said member terminating in a free end portion remote from a pressure gauge to provide means for applying the pressure gauge to and in operative alinement with a valve stem.

4. A device for applying and operating a tire pressure gauge, comprising a member adapted to be rigidly mounted on and extend laterally from a tire pressure gauge, the said member terminating in a free end portion remote from a gauge on which it is mounted, and the said free end portion providing means for alining a gauge with a valve stem against lateral displacement therefrom and for applying pressure to the gauge to force the same into operative engagement with the valve stem.

5. A device for applying and operating a tire pressure gauge, comprising a member adapted to be mounted on a tire pressure gauge intermediate the operating ends of the gauge, whereby the ends of a gauge are visible and unobstructed thereby, the said member adapted to extend laterally from a gauge and terminating in a free end portion remote from the gauge, and the said free end portion providing means for manually applying the gauge to a valve stem and for alining the gauge with the valve stem against inoperative displacement therefrom.

6. A device for manually applying and operating a tire pressure gauge, comprising a body length provided at one end thereof with a pressure gauge receiving member and provided at the opposite end thereof with a free end portion remote from said gauge receiving member, the said body length providing means for applying a pressure gauge mounted in said receiving member to a valve stem, and the said free end portion providing means remote from said receiving member for alining a pressure gauge with a valve stem.

7. A device for manually applying and operating a tire pressure gauge, comprising a pressure gauge receiving member adapted to rigidly secure a tire pressure gauge therein, and a member remote from said gauge receiving member, the said remote member providing means for alining a tire pressure gauge mounted in said receiving member to a valve stem and for operatively applying the gauge to the valve stem.

8. In a device for manually applying and operating a tire pressure gauge, an extension adapted to project laterally from a tire pressure gauge and to provide a free end portion remote from the gauge, said extension providing means for manually applying the gauge to a valve stem, and the said free end portion providing means remote from the gauge to aline the same with a valve stem and for applying pressure longitudinally of the gauge through said extension to force the gauge into operative engagement with the valve stem.

9. In a device for manually applying and operating a tire pressure gauge, a body length provided with a tire pressure gauge receiving member at one end thereof and provided with jaws at the opposite end thereof, the said gauge receiving member adapted to be mounted on a tire pressure gauge with the gauge extending transversely of said body length to form a cross member at one end thereof, the said body length adapted to extend laterally from a pressure gauge and terminate in a free end portion remote from the gauge, and said free end portion providing means for alining the gauge with a valve stem.

10. In a device for manually applying and operating a tire pressure gauge, a member adapted to extend laterally from and substantially rigid with a tire pressure gauge, and the said member providing means for manually applying and for operatively alining said gauge with a valve stem.

ELLWOOD J. HORNE.